Dec. 27, 1960   J. A. McELVAIN   2,966,562
INERTIA SWITCH

Filed Feb. 12, 1959   2 Sheets-Sheet 1

INVENTOR.
JOHN A. McELVAIN
BY
ATTORNEYS

Dec. 27, 1960
J. A. McELVAIN
2,966,562
INERTIA SWITCH
Filed Feb. 12, 1959
2 Sheets-Sheet 2
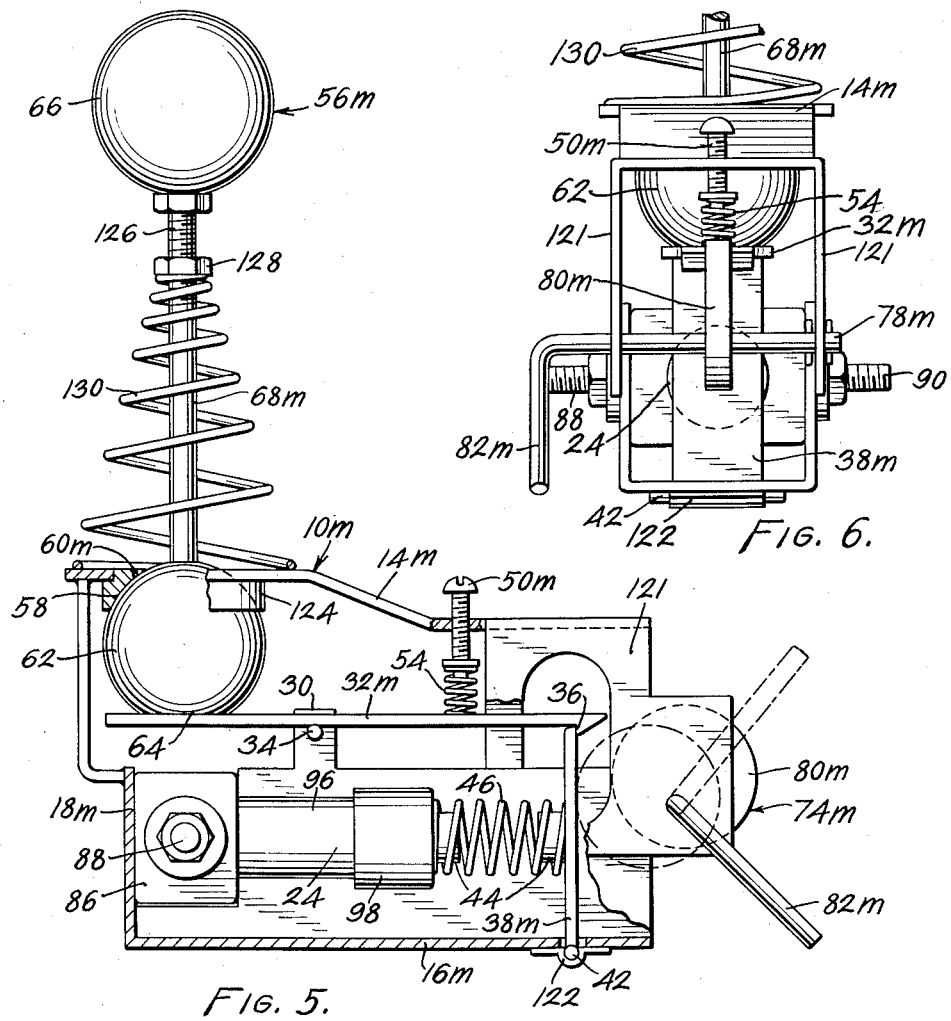
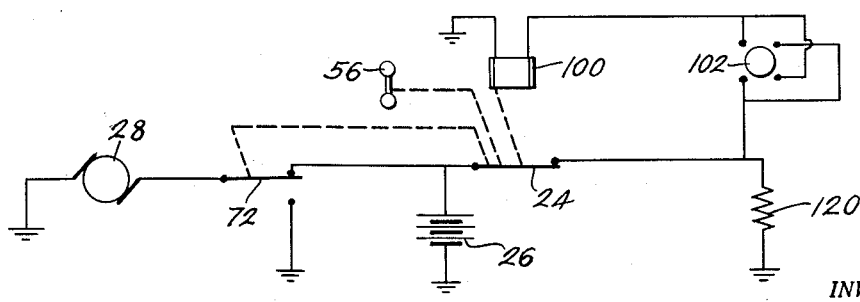
INVENTOR.
JOHN A. McELVAIN
BY
ATTORNEYS

United States Patent Office 2,966,562
Patented Dec. 27, 1960

2,966,562

INERTIA SWITCH

John A. McElvain, P.O. Box 27, Palisade, Colo., assignor of one-half to Paul T. Applegarth, Palisade, Colo.

Filed Feb. 12, 1959, Ser. No. 792,892

18 Claims. (Cl. 200—61.5)

This invention relates to switch mechanisms and, more specifically, to inertia-operated switching devices of a type particularly suited for use in automotive vehicles including busses and trucks.

A considerable number of automobile accidents occur each year in which the vehicles involved are entirely, or at least partially, destroyed by fire resulting from the spark ignition of spilled fuel. It is all too common to find that the occupants of these vehicles are killed or badly burned also, because they are unable to escape due to being unconscious or trapped by jammed doors and windows. In almost every instance of such an accident, however, the vehicle or vehicles involved have been subjected to a severe impact or an extraordinary change in attitude or position immediately preceding the fire. It would seem, therefore, that automotive vehicles equipped with inertia-type switching devices connected into the ignition circuit and operative upon either a severe impact blow or a substantial change in inclination relative to the horizontal would be effective to eliminate or at least bring about a considerable reduction in the property damage and the loss of life resulting from fires indirectly caused by automobile accidents.

An important but incidental feature of such a safety device is that it can also be used to prevent theft of a vehicle. A switching mechanism of this type, when in open position, even prevents operation of the vehicle with the ignition key which may fall into the hands of unauthorized persons. It is also well known that the ignition key is not absolutely necessary to start a vehicle as the ignition wires can easily be connected together in a manner to by-pass the ignition switch. Of course, nearly all hoods can be opened by anyone to reset the switch to closed position thereby rendering the ignition system operative once again; however, this depends upon knowledge of the existence of the switching device by the unauthorized person which is seldom the case.

As already mentioned, the switching device of the present invention is primarily designed for use in automotive vehicles which is probably its most important application. Conceivably, however, the basic principles presently to be set forth herein concerning this switching device could also be applied to machine tools and other mechanisms to shut off the electrical power in the event of a malfunction.

It is, therefore, the principal object of the present invention to provide a novel and improved inertia-operated switching device of a type especially suited for use in automotive vehicles to prevent fires following an accident.

A second objective is the provision of a switch including impact-responsive means operative to open an electrical circuit upon the application of a blow above a predetermined magnitude.

Another object of the invention is the provision of an impact switch having a mechanism included therein operative to break an electrical circuit when tilted beyond a certain point.

Still another object is to provide a switch of the type aforementioned which contains a novel reset mechanism.

A further object is the provision of an inertia-operated switching device that includes means for adjusting the force of the impact required to actuate it in order to prevent minor road shocks and the like from opening the ignition circuit.

Additional objects of the present invention are to provide a switching mechanism that is simple, relatively inexpensive, compact, foolproof and one that can be used in any of the popular automotive vehicles without modification other than the provision of suitable mounting brackets.

Other objects will be in part apparent and in part pointed out specifically hereinafter in connection with the description of the drawing that follows, and in which:

Figure 5 is a side elevation showing a second embodiment of the inertia switch which is simplified to include only the impact-operated actuator, certain portions thereof having been broken away to better show the construction;

Figure 6 is a front elevation of the embodiment of Figure 5 with portions broken away to conserve space; and Figure 7 is a schematic wiring diagram showing the manner in which the inertia switch is preferably connected into the ignition circuit.

Figure 1:
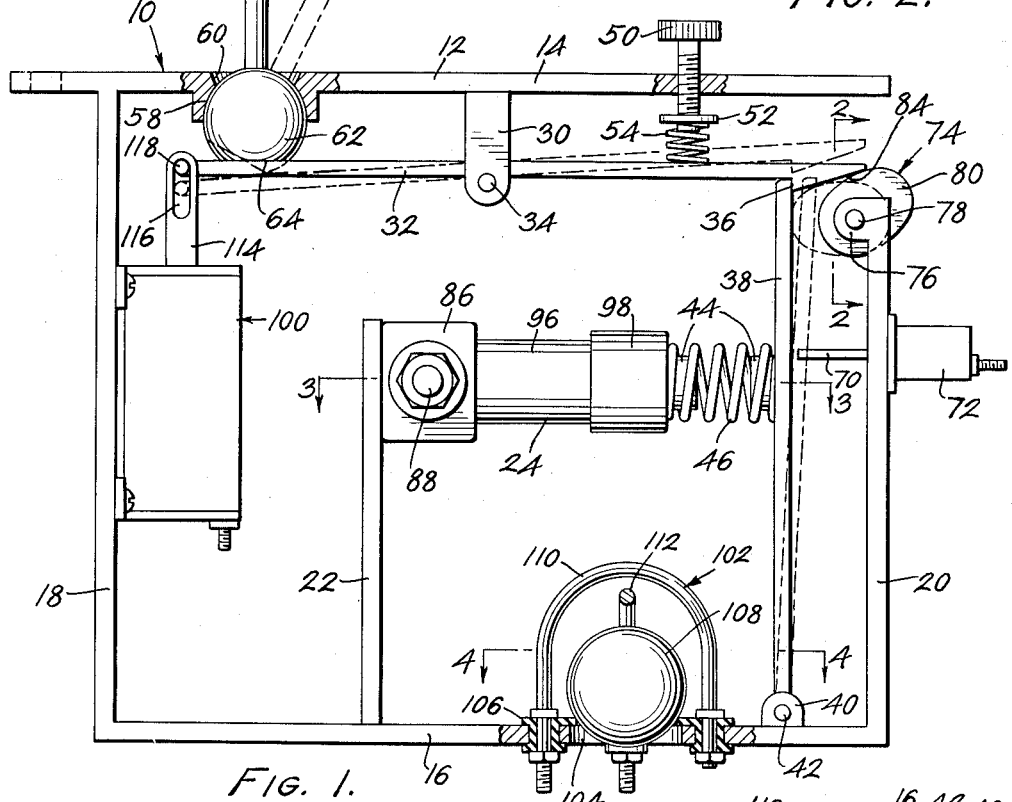
Figure 1 is a side elevation of one of the embodiments of the inertia switch of the present invention showing both the impact and tilt-operated actuators thereof, portions having been broken away and shown in section.

Referring now to the drawing and in particular, to Figure 1 thereof, it will be seen that the inertia switch of the present invention, which has been identified broadly by reference numeral 10, is contained or mounted within a frame 12 that includes a top wall 14, a bottom wall 16, a rear wall 18, a front wall 20 and a partial wall 22 depending from the bottom wall between the front and rear walls. Attached to the front face of the partial wall 22 is a switch element 24 that extends forwardly in the direction of front wall 20 and which is biased into normally open position as will be explained presently in connection with Figure 3 of the drawings. Switch element 24 is connected into the ignition circuit in series with the automobile battery 26 and generator 28, as will be seen in Figure 7, and is operative upon actuation to open this circuit thereby substantially eliminating the danger of fire from the spark ignition of spilled fuel following an accident.

The underside of top wall 14 of frame 12 is provided with a pair of transversely spaced ears 30 between which a rocker arm 32 is supported for rockable movement about a pivot axis 34 located intermediate the ends thereof. The front portion of rocker arm 32 is provided with a step 36 that forms a catch operative in the latched or full line position of Figure 1 to engage and hold pivot plate 38 in its retracted position which has also been shown in full lines. Pivot plate 38 is similarly mounted between ears 40 that depend from bottom wall 16 for movement about a transverse axis 42. The rear face of pivot plate 38 and the front end of switch element 24 each contain a short generally cylindrical projection 44 located in spaced face-to-face relation and adapted to form retaining means for a compression spring 46 extending therebetween. Spring 46 normally urges pivot plate 38 into its extended position shown by dotted lines in Figure 1 wherein switch element 24 is spring-biased by compression spring 48 contained therein into open position; however, when the pivot plate is latched in retracted position by rocker arm 32, spring 46 is compressed to a point where it will overcome spring 48 and close switch element 24.

A thumbscrew 50 is threaded through top wall 14 of the frame in position to overlie that portion of rocker arm 32 located ahead of pivot axis 34. The shank of this thumbscrew contains a skirt 52 adapted to form an abutment for the upper end of compression spring 54, the lower end of which rests on the top of the rocker arm and urges the same into latched position. Thumbscrew 50 performs a valuable function in the instant invention as it is adjustable to vary the force applied to rocker arm 32 by compression spring 54 which, in turn, determines the impact force required to trip the impact-operated actuator that will be described shortly and which has been identified broadly by numeral 56. Of course, the other equally important function of thumbscrew 50 and spring 54 is to maintain the rocker arm 32 in a normally latched position.

Now, at a position above the rear portion of rocker arm 32, top wall 14 of the frame contains a generally hemispherical depression or socket 58 on the underside thereof which connects with a frusto-conical depression 60 in the top surface. The impact-operated actuator 56 includes a sphere or ball 62 mounted for universal movement within hemispherical socket 58 and which contains a truncated section 64 resting on the top surface of rocker arm 32 at a point spaced to the rear of pivot axis 34. Sphere 62 is connected through intersecting depressions 58 and 60 in top wall 14 to a relatively heavy mass 66 by means of a rigid stem 68. The normal position of actuator 56 is that shown in full lines in Figure 1 wherein mass 66 is located directly above sphere 62 with stem 68 upright and substantially vertical while truncated portion 64 thereof lies flat on rocker arm 32. This position of the actuator 56 enables spring 54 to urge the rocker arm into the latched full line position wherein pivot plate 38 is held retracted thus closing switch element 24 by means of spring 46 to complete the ignition circuit. When, however, an impact blow or shock is received by the inertia switch mechanism above-described of a magnitude sufficient to throw mass 66 off center in spite of the opposition to this motion exerted by spring 54, sphere 62 will turn tilting truncated surface 64 in a manner such that the rear end of the rocker arm will be depressed raising the front end and releasing pivot plate 38 from the catch or step 36 to return to extended position where switch element 24 opens under the action of spring 48 contained therein. This, of course, immediately opens the ignition circuit.

As the rocker arm is tripped to release the pivot plate into its extended or dotted line position, it engages and depresses the switch arm 70 of a single pole double throw switch element 72 mounted on the front wall 20 of frame 12. As will be explained hereinafter in connection with Figure 7, the first or normal position of switch 72 is to connect battery 26 and generator 28 in series with one another. When, however, switch element 24 opens, pivot plate 38 will actuate switch 72 moving it to a second position wherein the positive side of the generator is disconnected from the battery and connected to ground thus grounding both sides of the generator and rendering the same inoperative. The primary purpose of switch 72 is, of course, to disconnect the generator and prevent the possibility of a spark therefrom even though the ignition circuit is opened through switch 24, as there is still a likelihood that the vehicle will continue to move in gear and turn over the generator for a brief period following an impact of sufficient magnitude to trip impact-operated actuator 56.

Figure 2:
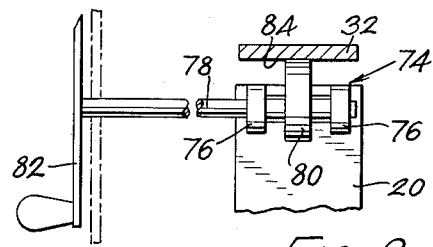
Figure 2 is a fragmentary sectional detail taken along line 2—2 of Figure 1 showing the reset mechanism.

Now, with reference to Figures 1 and 2 of the drawing, the reset mechanism which has been indicated broadly by numeral 74 will be described. The upper end of front plate 20 of the frame is provided with a pair of transversely spaced ears 76 that extend rearwardly therefrom and receive a shaft 78 for rotational movement upon which is fixed a generally elliptical cam 80. One end of shaft 78 is provided with a crank 82 for rotating same and the shaft, or a portion thereof, may be flexible so that the crank can be located in the driving compartment of the vehicle. Cam 80 is, of course, eccentrically mounted on shaft 78 and upon rotational movement from the full line to the dotted line position of Figure 1, engages the front face to pivot plate 38 moving it rearwardly from extended to retracted position when it is latched in place by rocker arm 32. Note that the front portion of rocker arm 32 between step 36 and the end thereof is formed to provide an inclined surface 84 on the underside thereof that is also engaged by cam 80 when turned counter-clockwise in Figure 1 to lift the arm against the force exerted by spring 52 thus permitting plate 38 to move into latched position. Spring 54 also snaps the step 36 of the rocker arm into place ahead of plate 38 when it has been cammed past inclined surface 84. Even clockwise rotation of cam 80 will reset the device as the upper edge of pivot plate 38 will lift the front end of the rocker arm by sliding along the inclined surface 84 thereof instead of the cam. Also, once the pivot plate 38 is positioned behind step 36 of the rocker arm and it is free to latch, the spring 54 will function to raise the rear end thereof and return impact element 56 to its upright position.

Figure 3:
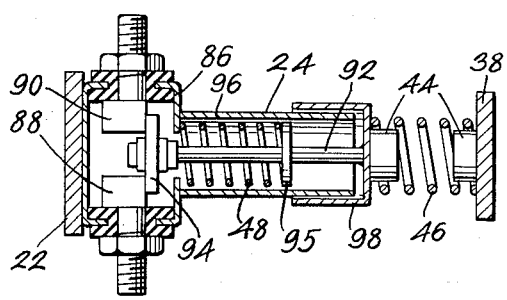
Figure 3 is a section taken along line 3—3 of Figure 1 showing the details of the switch element of the assembly which is biased into normally open position.

In Figure 3, switch element 24 has been shown in detail and, although it is of a well known construction, will be described briefly. A contact housing 86 is mounted on partial wall 22 of the frame and includes a pair of insulated contacts 88 and 90 mounted in opposite ends thereof in spaced relation. Housing 86 has an opening therethrough into which extends a reciprocating switch arm 92 having means 94 on the inner end thereof adapted to interconnect contacts 88 and 90 when it is depressed. Spring 48 mounted between contact housing 86 and a collar 95 carried by the stem of the switch arm 92, normally biases switch element 24 into open position. The spring 48 and switch arm 92 are shown enclosed within a tubular housing 96 and a telescoping cap 98 is mounted on the outer extremity of the switch arm for movement therewith relative to housing 96.

Figure 4:
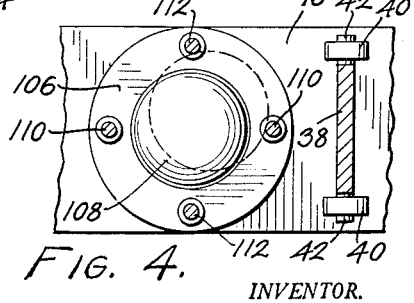
Figure 4 is a section taken along line 4—4 of Figure 1 showing the tilt-operated actuator of the inertia switch.

The tilt-operated switch actuating mechanism of the present invention, indicated broadly by numerals 100 and 102 identifying a solenoid and ball switch respectively, can best be seen in Figures 1 and 4 to which reference will now be had. An opening 104 is provided in the bottom wall 16 of the frame into which is inserted a collar or ring 106 formed from an insulating material. A metal ball 108 rests in the circular opening in the insulating collar and is free to roll out if the switching device is tilted beyond a certain point which is a function of the diameter of the ball in relation to the diameter of the opening in which it rests. A pair of arched contacts 110 and 112 are attached to the insulating ring in spaced but crossed relation to one another and in spaced relation to the ball which they curve over. One of these arched contacts is grounded through solenoid 100 while the other is connected to battery 26 through switch element 24. The legs of contacts 110 and 112 are arranged relative to one another and to ball 108 such that whenever the ball rolls out of the insulating ring 106, it will close the circuit by connecting these contacts thus energizing solenoid 100 provided that switch element 24 remains closed. Of course, if switch 24 has already been opened by impact-operated actuator 56, the solenoid cannot function, but, there is no necessity for it to do so as its sole purpose is to open switch 24 if actuator 56 fails to perform this function.

Solenoid 100 is attached to the rear wall 18 of the frame with the movable core 114 thereof extending upwardly in position to be connected to the rear end of rocker arm 32. Core 114 of the solenoid has an elongated slot 116 therein adapted to receive pin 118 located at the rear end of rocker arm 32 and form a lost-motion connection therebetween. In other words, this pin and slot connection enable the impact-operated actuator 56 to depress and trip the rocker arm without effecting the solenoid. When, however, no impact blow is received by the vehicle or at least one of insufficient force to throw actuator 56 off center, yet, the vehicle is rolled over or tilted beyond that which is encountered under normal driving conditions, ball 108 will roll out of the opening 104 in ring 106 to connect contacts 110 and 112 together thus energizing solenoid 100 and depressing rocker arm 32. This, of course, releases the pivot plate 38 as before and opens switch element 24 along with stitch 72. It is apparent that either one or both of the actuators 56 and 102 are operative to open switches 24 and 72.

In the circuit diagram of Figure 7, most of the important elements of which have already been described, it will be seen that battery 26 and generator 28 are connected in series with one another and with the load 120 in the conventional manner commonly found in an automotive vehicle although several elements of the ordinary ignition circuit such as the coil, voltage regulator and ignition switch have not been illustrated as they form no part of the present invention and would merely clutter the drawing. Switch element 24 is connected in series between the battery and load while being mechanically coupled with the impact-operated actuator 56 by means of the rocker arm 32, pivot plate 38 and spring 46 as aforementioned. Single pole double throw switch 72, on the other hand, in its first or normal position is connected in series between the battery and generator; whereas, in second position it opens the circuit to the battery and grounds the positive side of the generator. Switch 72 is mechanically coupled with switch 24 by means of switch arm 70, pivot plate 38 and spring 46 such that it moves from first to second position only after switch 24 has opened. Finally, the tilt-operated actuator 100 and 102 is preferably connected between switch 24 and the load 120 in series with both the battery and generator. Ball switch 102 is normally open while solenoid 100 is deenergized although mechanically coupled with switch 24 by means of rocker arm 32, pivot plate 38 and spring 46. With switch 24 closed, when ball switch 102 is actuated to closed position, it will energize solenoid 100 to open switch 24 and also switch 72.

The second embodiment of the inertia switch of the present invention is that which has been illustrated in Figures 5 and 6 and identified by reference character 10m. Identical parts have been given identical reference characters; whereas, those elements that have been modified but which have counter parts in the first embodiment have been given the same reference number followed by the postscript "m." For the most part, the second modification involves merely changes in design that are brought about by the elimination of the tilt-operated actuator 100 and 102 from the unit along with switch 72 which may be included if desired. For example, the frame 12m which includes elements 14m—18m along with certain new elements to be mentioned shortly, is merely made more compact while the front wall has been eliminated in favor of sidewalls 121 and switch 24 is attached directly to rear wall 18m thus eliminating the partial wall. Shaft 78m is shortened and mounted for rotation between the sidewalls 120 while crank 82m is changed slightly and operated at the switch under the hood rather than remotely inside the driving compartment. Cam 80m is shown circular, although eccentrically mounted on shaft 78m, rather than generally elliptical as before. Pivot plate 38m is shortened and hinged differently to bottom wall 16m by means of bracket 122. The rocker arm 32m has also been shortened and the connection for the solenoid has been eliminated from the rear end thereof. A slightly different type of adjusting screw 50m has been shown and depressions 58 and 60m have been shown formed in a collar 124 attached to top wall 14m rather than as an integral part of said wall. The basic and only significant change in the Figures 6 and 7 modification, however, is the construction of the impact-operated actuator 56m for switch 24 which will now be described.

First of all, sphere 62 and mass 66 remain the same and perform their identical functions; however, the stem 68m that interconnects these two elements is modified substantially. In the form shown, stem 68m includes a threaded section 126 at the upper end thereof on which is mounted a nut or other adjustment means 128. A truncated conical helical compression spring 130 is positioned around stem 68m resting on top wall 14m of the frame and compressed against nut 128. Here, spring 130 is used to adjust the impact force required to throw mass 66 off center rather than spring 54 which functions primarily to hold rocker arm 32m in latched position relative to pivot plate 38m. This construction has certain advantages over that shown in Figures 1–4 in that spring 130 functions to return the mass 66, stem 68m and sphere 62 immediately to the neutral or upright position as soon as the force of the impact has diminished and irrespective of the position of the rocker arm. Of course, the construction of actuator 56m could be substituted for that of actuator 56 in the first embodiment without the exercise of invention.

Having thus described the several useful and novel features of the inertia switch of the present invention in connection with the two specific embodiments thereof illustrated herein, it will be apparent that the many worthwhile objectives for which it was designed have been achieved. I realize, however, that certain changes and modifications in these embodiments may occur to those skilled in the art within the broad teaching found herein; hence, it is my intention that the scope of protection afforded hereby shall be limited only insofar as said limitations are expressly set forth in the appended claims.

What is claimed is:

1. In a switching device, first switch means normally biased into open position, yieldable abutment means mounted adjacent the first switch means for movement between an extended and a retracted position relative thereto, first resilient means operatively interconnecting the yieldable abutment means and first switch means adapted to bias the latter into closed position when the former is in retracted position, latch means operatively connected to the yieldable abutment means and adapted to releasably hold same in retracted position, second resilient means operatively connected to the latch means and adapted to bias same into latched position, and impact-operated actuating means connected to the latch means and adapted to trip same under the influence of an impact blow thereby releasing the yieldable abutment to extended position opening the first switch means, said actuating means comprising a substantially spherical element mounted for universal movement having a truncated portion normally resting on the latch means and a mass rigidly connected to the spherical element in spaced relation thereto.

2. The switching device as set forth in claim 1 in which a second switch means normally biased into closed position is mounted adjacent the yieldable abutment, the yieldable abutment operating to open same upon movement thereof to extended position.

3. The switching device as set forth in claim 1 in which a tilt-operated actuating means is connected to the latch means and adapted to trip same when inclined relative to the horizontal thereby releasing the yieldable abutment to extended position opening the first switch means, said actuating means comprising a solenoid operatively connected to the latch means adapted to trip same upon energization thereof and a normally open tilt switch connected to the solenoid to energize same when closed, the tilt switch including a pair of electrical contacts insulated from one another and a conductive ball supported for movement from an open to a closed position in engagement with both contacts when tilted.

4. The switching device as set forth in claim 1 in which adjustment means are operatively connected to the second resilient means adapted to vary the force exerted thereby upon the latch means.

5. The switching device as set forth in claim 1 in which the latch means comprises a rocker arm mounted for pivotal movement about an axis intermediate the ends thereof and having a step in one end adapted to hook over the yieldable abutment.

6. The switching device as set forth in claim 1 in which the yieldable abutment means comprises a pivot plate hingedly mounted for swinging movement relative to the first switch means.

7. The switching device as set forth in claim 1 in which a ring having a substantially hemispherical depression therein is provided to receive the spherical element for universal movement, and a third resilient means operatively interconnects the ring and mass adapted to yieldably maintain the latter in a neutral unactuated position.

8. The switching device as set forth in claim 1 in which reset means are provided for moving the yieldable abutment means from extended to retracted position, said reset means comprising a rotatable shaft and a cam mounted on the shaft for movement against the yieldable abutment means adapted to overcome the force extered thereon by the first resilient means.

9. The switching device as set forth in claim 2 in which the yieldable abutment means comprises a pivot plate hingedly mounted for swinging movement between the first and second switch means.

10. The switching device as set forth in claim 3 in which an insulating ring is provided to receive the conductive ball, and the pair of electrical contacts comprise two arched conductors arranged in crossed relation over the top of the ball with the ends thereof attached to the insulating ring.

11. The switching device as set forth in claim 3 in which means comprising a lost-motion coupling provides the operative connection between the solenoid and latch means, said coupling including a cooperating pin and slot.

12. The switching device as set forth in claim 4 in which the adjustment means comprises a threaded element, and the second resilient means comprises a spring adapted to exert a force on the latch means in latched position sufficient to return and maintain the impact-operated actuating means in neutral or unactuated position.

13. The switching device as set forth in claim 7 in which the third resilient means comprises a conical helical compression spring.

14. The switching device as set forth in claim 8 in which the cam is elliptically shaped.

15. The switching device as set forth in claim 8 in which crank means are provided on one end of the shaft for rotating same.

16. In a switching device, first switch means normally biased into open position, yieldable abutment means mounted adjacent the first switch means for movement between an extended and a retracted position relative thereto, first resilient means operatively interconnecting the yieldable abutment means and first switch means adapted to bias the latter into closed position when the former is in retracted position, latch means operatively connected to the yieldable abutment means and adapted to releasably hold same in retracted position, second resilient means operatively connected to the latch means and adapted to bias same into latched position, and tilt-operated actuating means connected to the latch means adapted to trip same when inclined relative to the horizontal thereby releasing the yieldable abutment to extended position opening the first switch means, said actuating means comprising a solenoid operatively connected to the latch means adapted to trip same upon energization thereof and a normally open tilt switch connected to the solenoid to energize same when closed, the tilt switch including a pair of electrical contacts insulated from one another and a conductive ball supported for movement from an open to a closed position in engagement with both contacts when tilted.

17. The switching device as set forth in claim 16 in which means comprising a lost-motion coupling provides the operative connection between the solenoid and latch means, said coupling including a cooperating pin and slot.

18. The switching device as set forth in claim 16 in which an insulating ring is provided to receive the conductive ball, and the pair of electrical contacts comprise two arched conductors arranged in crossed relation over the top of the ball with the ends thereof attached to the insulating ring.

References Cited in the file of this patent

UNITED STATES PATENTS

| | | |
|---|---|---|
| 1,868,365 | Paul | July 19, 1932 |
| 1,915,267 | Bigelow | June 27, 1933 |
| 2,236,872 | Grigsby | Apr. 1, 1941 |
| 2,756,298 | Lewis | July 24, 1956 |
| 2,912,535 | Sullivan | Nov. 10, 1959 |